(12) United States Patent
Graven

(10) Patent No.: US 6,178,692 B1
(45) Date of Patent: *Jan. 30, 2001

(54) LIGHTING SYSTEM FOR USE WITH A VERTICAL GROWING COLUMN

(75) Inventor: Robert E. Graven, Louisville, TN (US)

(73) Assignee: Agri-Grow Technologies, Inc., Knoxville, TN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/621,491

(22) Filed: Mar. 25, 1996

Related U.S. Application Data

(63) Continuation-in-part of application No. 08/278,247, filed on Jul. 21, 1994, now Pat. No. 5,533,302.

(51) Int. Cl.[7] .................................................. A01G 25/00
(52) U.S. Cl. ........................................... 47/82; 47/DIG. 6
(58) Field of Search .................................. 47/DIG. 6, 82, 47/85

(56) References Cited

U.S. PATENT DOCUMENTS

| 3,389,499 | | 6/1968 | Haile | 47/33 |
|---|---|---|---|---|
| 3,931,695 | * | 1/1976 | Widmayer | 47/DIG. 6 |
| 4,123,873 | | 11/1978 | Canova | 47/83 |
| 4,163,342 | * | 8/1979 | Fogg | 47/DIG. 6 |
| 4,216,617 | | 8/1980 | Schmidt | 47/62 |
| 4,250,666 | * | 2/1981 | Rakestraw | 47/DIG. 6 |
| 4,389,813 | | 6/1983 | Jaques et al. | 47/67 |
| 4,779,378 | | 10/1988 | Mason, Jr. | 47/83 |
| 5,031,359 | | 7/1991 | Moffett, Jr. et al | 47/83 |
| 5,136,807 | | 8/1992 | Orlov | 47/83 |
| 5,251,399 | * | 10/1993 | Rasmussen | 47/82 |
| 5,276,997 | | 1/1994 | Swearengin et al. | 47/82 |

* cited by examiner

Primary Examiner—Michael J. Carone
Assistant Examiner—Joanne C. Downs
(74) Attorney, Agent, or Firm—Pitts & Brittian

(57) ABSTRACT

A lighting system for use with a vertical growing column (10) for optimally growing a plurality of plants in an indoor environment and enhancing the tonnage per unit area or per unit volume of product harvestable from plants positioned in these columns (10). The lighting system for use with a vertical growing column (10) includes a vertical growing column (11) having a plurality of modular planting units (12), a lighting system (104) and an apparatus (108) for carrying the lighting system (104). Each of the modular planting units (12) includes a center column (14) having a pair of lateral receptacles (16) projecting from opposed sides of the center column (14) and a mounting flange (18) extending downwardly from a lowermost portion of the center column (14) for being received within an uppermost portion of a center column (14) of another planting unit (12). The lighting system (104) utilizes sulfur lighting tubes (106) which are mounted to a vertically adjustable, movable apparatus (108) and sulfur lighting fixtures (122) which are fixably mounted to the walls, beams or related structures of a greenhouse or growing facility to insure the exposure of plants received in the receptacles (16) of the vertical columns (11) to optimal lighting conditions for maximum year-round growth potential.

22 Claims, 10 Drawing Sheets

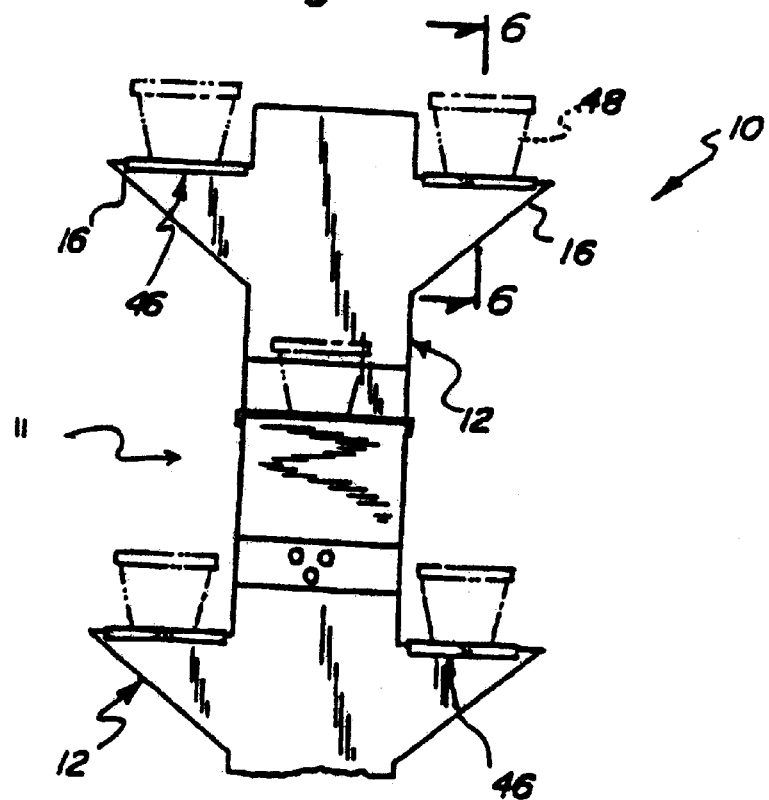
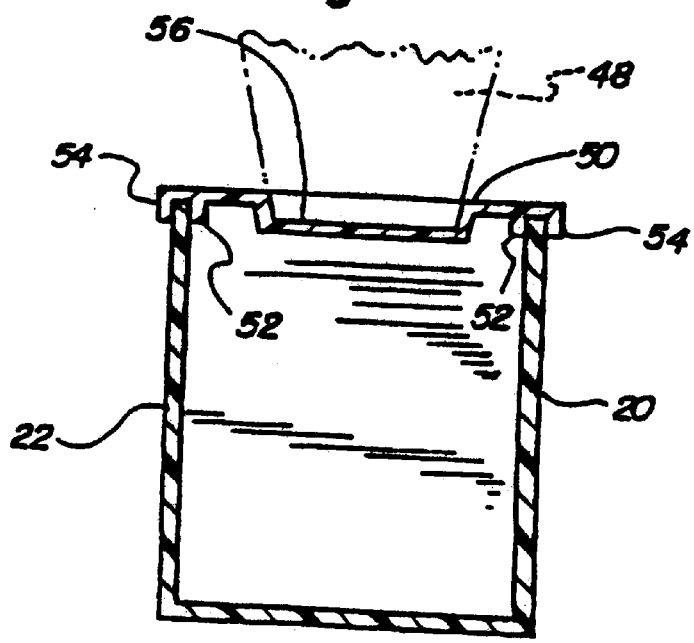

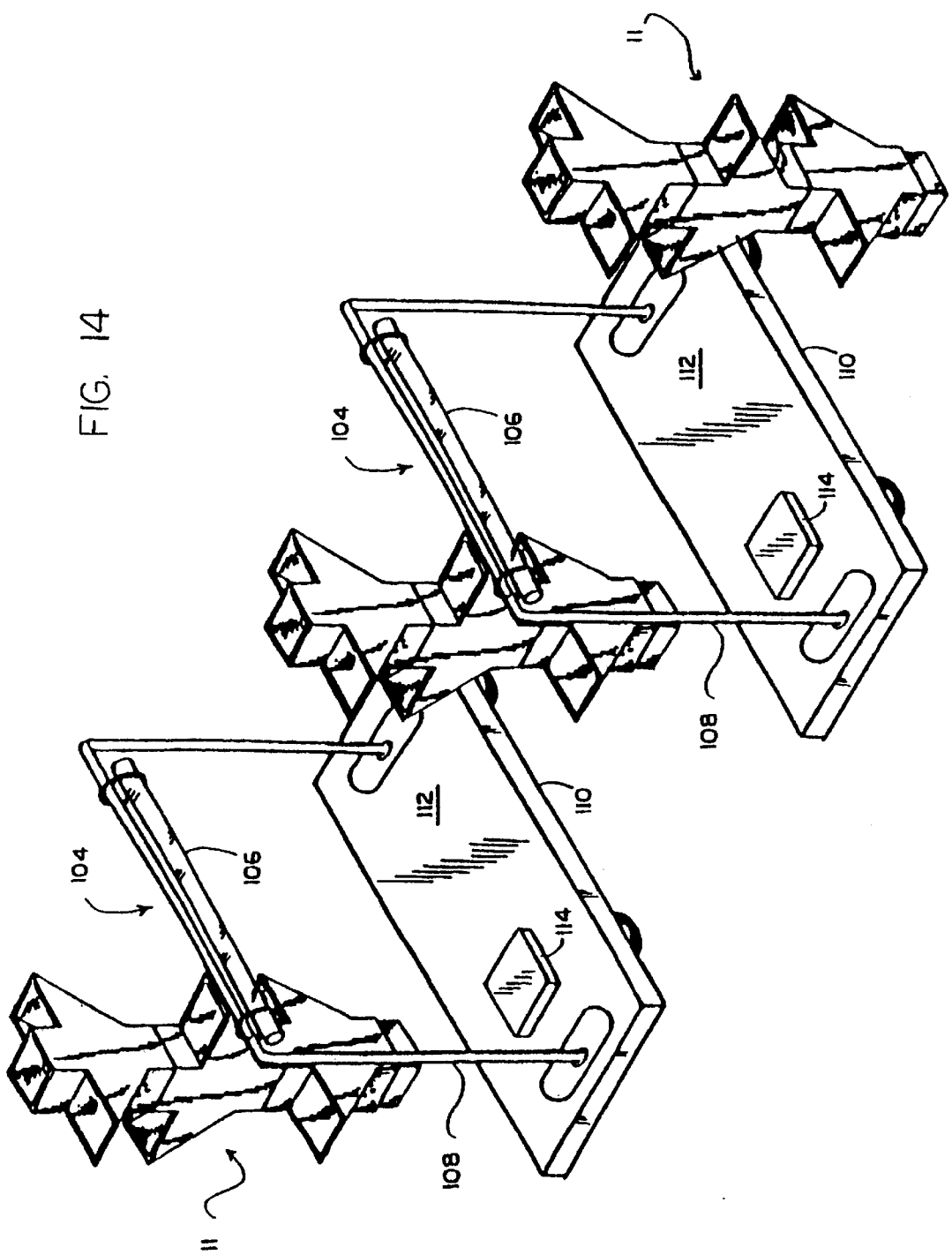

LIGHTING SYSTEM FOR USE WITH A VERTICAL GROWING COLUMN

This application continuation-in-part discloses and claims subject matter disclosed in my earlier filed application, Ser. No. 08/278,247 filed on Jul. 21, 1994 and now U.S. Pat. No. 5,533,302.

TECHNICAL FIELD

This invention relates to the field of vertical planters and more particularly pertains to a lighting system for use with a vertical growing column which optimizes the growth of plants which are cultivated in an indoor environment. Such plants include mature plants, seedlings, saplings and other related forms of plant growth. Moreover, vertical growing columns as discussed herein include any structure intended to enhance the tonnage per unit area or per unit volume of product harvestable from plants cultivated in these columns.

BACKGROUND ART

In the field of agriculture, it is well known that planters are employed for the purpose of cultivating and supporting plants. Vertical growing columns are planters which are especially desirable for cultivating plants in an indoor environment or an outdoor environment in which conventional growing methods are disfavored. Among its other advantages, growing columns are used to facilitate volume plant growth in a minimum area.

Despite these advantages, vertical growing columns presently available are unable to achieve an optimum yield from the cultivated plants disposed within them as a consequence of impediments inherent in the construction of these columns. Chief among these defects is the overall structure of the columns which discriminates in the type and amount of light to which each plant is exposed. The quality and quantity of light to which a plant is exposed is contingent upon its position in the growing column. This disparity in light exposure results in a distinct variation in the quality of the product harvested. The variation is manifested by the gradual deterioration in product quality as the column is viewed from the top to the bottom.

As the structure of these columns is essential to both the amount of a grower's growing space and the volume of a grower's crop, it is essential to overcome this critical disadvantage, without structural modification. The present invention accomplishes this objective by optimizing the quality and quantity of light received by the plants, regardless of their position in the column, and maximizing the corresponding quantity and quality of the expected yield.

Other devices have been produced to provide alternative methods for cultivating plants in an indoor or an outdoor environment. Typical of the art are those devices disclosed in the following U.S. Patents:

| Pat. No. | Inventor(s) | Issue Date |
| --- | --- | --- |
| 3,389,499 | E. Haile | Jun 25, 1968 |
| 4,123,873 | R. Canova | Nov 07, 1978 |
| 4,216,617 | M. Schmidt | Aug 12, 1980 |
| 4,389,813 | M. J. Jaques, et al. | Jun 28, 1983 |
| 4,779,378 | S. I. Mason, Jr. | Oct 25, 1988 |
| 5,031,359 | F. W. Moffett, Jr. | Jul 16, 1991 |
| 5,136,807 | D. Orlov | Aug 11, 1992 |
| 5,276,997 | M. L. Swearengin, et al. | Jan 11, 1994 |

The '499 patent issued to Haile discloses an outdoor planting wall which includes a plurality of vertically spaced blocks adapted to contain soil and plants. The front side wall of each individual block is bowed out to define a lateral enlargement which serves as a planting trough. In formation, the blocks are laterally staggered and locked together to form a wall with planting troughs projecting entirely from one or both faces of the wall.

The '873 patent issued to Canova discloses a cellular structure for growing plants in an indoor environment. The cellular structure includes inclined walls which enclose about a nutritive medium and a multiplicity of openings within those walls for receiving plants.

The '617 patent issued to Schmidt discloses an indoor hydroponic planting system whose framework provides irrigation piping and a manifold to circulate water used to nourish the plants throughout the system, as well as a cable mechanism for manually rotating the plant receptacles from the bottom to the top of the planter system.

The '813 patent issued to Jaques, et al., discloses a multi-component, PVC pipe-type indoor planter system having an electrical cord received within a tube which is centrally disposed within the fixed length of the planter system's central trunk.

The '378 patent issued to Mason discloses a stackable planter system which requires that each section be soil filled prior to assembly and that the units bear a specific orientation atop one another.

The '359 patent issued to Moffett, Jr. discloses an outdoor vertical garden structure which includes a unitary molded structure having a top and bottom cover and a plurality of spaced plant openings which allow access to a housed growing medium, as well as a method for producing the garden structure.

The '807 patent issued to Orlov discloses an arrangement for growing plants including multiple planters stacked atop each other to attain a columnar form wherein each container is partially filled with a medium for growing plants.

The '997 patent issued to Swearengin, et al., discloses a vertical planter which consists of an elongated cylindrical pipe having a self-contained watering system and a plurality of protruding openings disposed about the pipe surface but which lacks the means to prevent soil compaction and resulting plant atrophy.

None of these patents discloses a lighting system for lighting a vertical growing column which includes an apparatus for carrying and disposing a lighting system about a vertical planter and an external fluid dispensing system for nourishing plants disposed within each individual plant receptacle of the growing column. Neither do any of these devices teach or disclose a lighting system for use with a vertical growing column which utilizes sulfur lighting to luminate the colors of the rainbow to enhance the growth potential of all plants in the vertical plant column. Nor do any of these devices teach or disclose a lighting system for use with a vertical growing column which uniformly distributes the maximum necessary lighting for plants and seedlings disposed in a vertical growing column which facilitates plant growth regardless of the plant's position in the column. Nor do any of these devices disclose a lighting system which utilizes a plurality of lights of varying shapes which are disposed about a series of vertical growing columns such that there is no limit on the height of the vertical growing column which can be effectively employed to grow and cultivate plants.

Therefore, it is an object of this invention to provide a lighting system for use with a vertical growing column which supports the growth of a plurality of plants arranged in a vertical column.

It is also an object of the present invention to provide a lighting system for use with growing structures of any configuration which enhances the tonnage per unit area or per unit volume of product harvestable from plants cultivated in the columns.

Another object of this invention is to provide a lighting system for use with a vertical growing column in which the lighting system provides "near-sunlight" for the interior growth of plants.

An additional object of this invention is to provide a lighting system for use with a vertical growing column in which the lighting system provides the bright full character colors of sunlight to enhance plant growth potential.

It is an object of this invention to provide a lighting system for use with a vertical growing column in which the lighting system reduces plant exposure to unwanted UV light.

It is also an object of this invention to provide a lighting system for use with a vertical growing column which maximizes light color for plants while minimizing energy consumption costs in providing that lighting.

Further, it is an object of this invention to provide a lighting system for use with a vertical growing column in which the lighting system is easily positioned and repositioned about the vertical growing column.

It is also an object of this invention to provide a lighting system for use with a vertical growing column which distributes light to inaccessible areas.

It is also object of this invention to provide a lighting system for use with a vertical growing column in which the lighting system includes a plurality of movable, adjustable sulfur tube lights and a plurality of sulfur light fixtures such that the lighting system provides sufficient light adequately and properly radiate plants and seedlings disposed in a plurality of vertical growing columns regardless of the height of the vertical growing columns.

It is also an object of this invention to provide a lighting system for use with a vertical growing column which further includes an external fluid dispensing system for dispensing fluid to each of the individual plant receptacles, and supporting structure for supporting the system in a vertical orientation.

Moreover, it is an object of this invention to provide a lighting system for use with a vertical growing column which utilizes a lighting system that increases environmental safety in the dispersal of light.

Additionally, it is an object of this invention to provide a lighting system for use with a vertical growing column in which the lighting system and the vertical growing column are both easily maintained and/or replaced and which require minimal maintenance.

Further, it is an object of this invention to provide a lighting system for use with a vertical growing column which is of a durable and reliable construction.

It is an object of this invention, as well, to provide a lighting system for use with a vertical growing column which is easily and efficiently manufactured and marketed.

DISCLOSURE OF THE INVENTION

Other objects and advantages will be accomplished by the present invention which serves to equally illuminate a plurality of plants arranged in a vertical growth column using "near-sunlight" to enhance their growth potential and, thereby, maximize plant production per unit area or per unit volume of product harvestable from plants cultivated in the columns. The lighting system for use with a vertical growing column of the present invention includes a vertical growing column, a lighting system and an apparatus for carrying the lighting system. The vertical growing column includes a plurality of modular planting units. Each of the modular planting units includes a center column having a pair of plant receptacles projecting from both sides of the center column. A mounting flange extends downwardly from a lowermost portion of the center column and is received within an uppermost portion of a center column of another planting unit. The modular planting units are stacked together at various relative angular orientations to form a vertical column. The lighting system integrates sulfur lighting such as that manufactured by Fusion Lighting Systems, Inc., to provide plants received in the lateral receptacles of the modular planting units with optimal lighting conditions for year-round growth. The lighting system includes a sulfur light and a magnetron for generating microwave energy to power the sulfur light. The apparatus for carrying the lighting system is a stand which is both movable and vertically adjustable to effectively light vertical growing columns of variable heights from various alternative angles. Reflectors are selectively incorporable in the lighting system to enhance the radiative capacity of the sulfur lights. Further, the light system for use with a vertical growing column is adaptable for computer monitoring.

BRIEF DESCRIPTION OF THE DRAWINGS

The above mentioned features of the invention will become more clearly understood from the following detailed description of the invention read together with the drawings in which:

FIG. 5 is a front elevation view of a modular planting system including a plurality of plates;

FIG. 6 illustrates a cross-section view taken along line 6—6 of FIG. 5;

FIG. 14 illustrates an embodiment of the present invention which includes a plurality of light sources in combination with a plurality of vertical growing columns;

BEST MODE FOR CARRYING OUT THE INVENTION

A lighting system for use with a vertical growing column incorporating various features of the present invention is illustrated generally at 10 in the figures. The lighting system for use with a vertical growing column 10 is designed to enhance the growth potential of plants cultivated in vertical planters. Moreover, in the preferred embodiment the lighting system for use with a vertical growing column 10 is designed to optimize plant growth potential by adjustably furnishing sulfur lighting to plants regardless of disposition within the column and providing nourishment to each individual plant receptacle of the vertical planter via an external fluid dispensing system 58. The lighting system for use with a vertical growing column 10 of the present invention includes a vertical growing column 11 having a plurality of modular planting units 12, a lighting system 104 and an apparatus 108 for carrying the lighting system 104.

Figure 1:
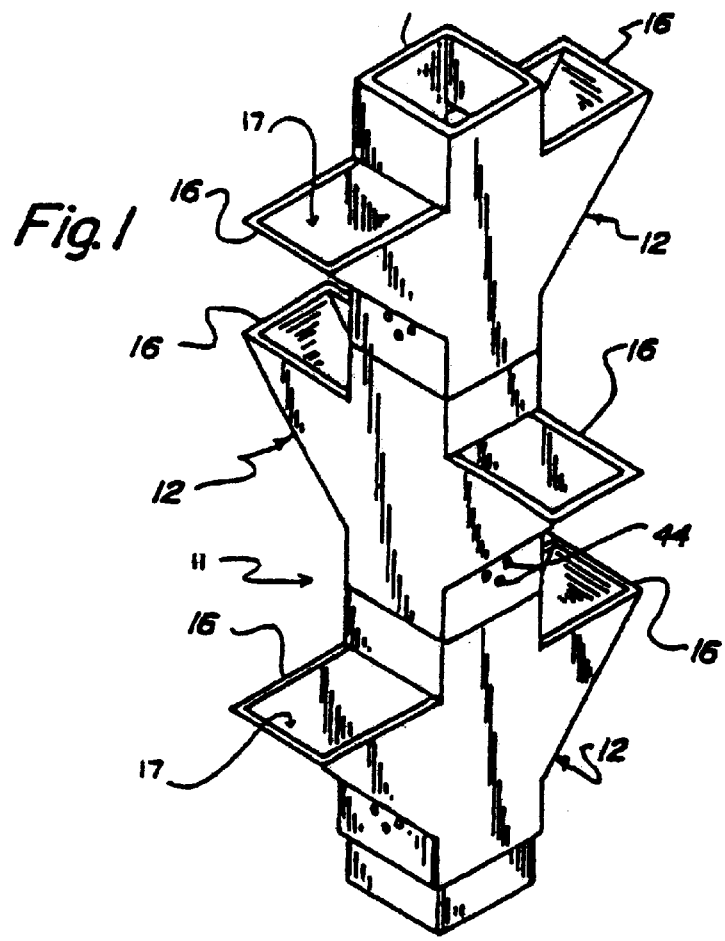
FIG. 1 is an isometric illustration of a vertical growing column constructed in accordance with several features of the present invention.
Figure 2:
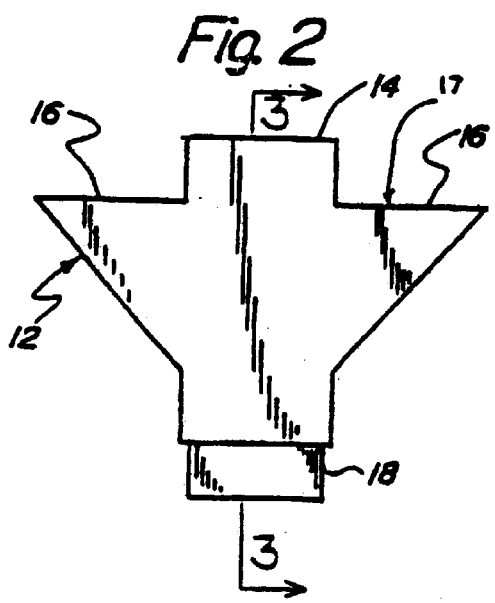
FIG. 2 illustrates a front elevation view of a modular planting unit comprising a portion of the present invention.

Each of the planting units 12 is substantially similar in construction and design and is arranged for reception within another center column 14 of another planting unit 12, thereby creating the vertical orientation illustrated in FIG. 1. Each planting unit 12 includes a center column 14 having a pair of lateral receptacles 16 which extend from opposed sides of the center column 14. Each lateral receptacle defines an opening 17 for receiving plants, growing media and/or plant nourishment. The lateral receptacles 16 are in fluid communication with the center column 14. The center column 14 and lateral receptacles 16 are preferably hollow to provide for fluid communication between the lateral receptacles 16 with the center column 14 such that a continuous volume of plant growing medium, such as soil or the like, may extend from a first one of the lateral receptacles 16 through the center column 14 to a second one of the lateral receptacles 16.

Figure 3:
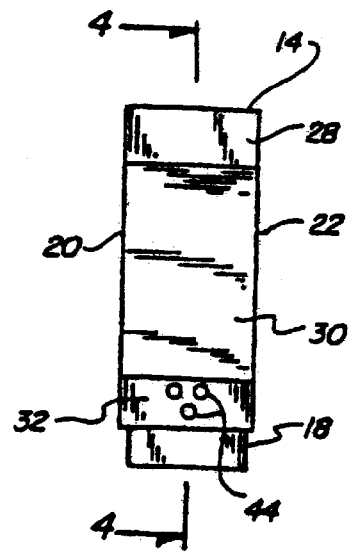
FIG. 3 is a side elevation view of a modular planting unit.
Figure 4:
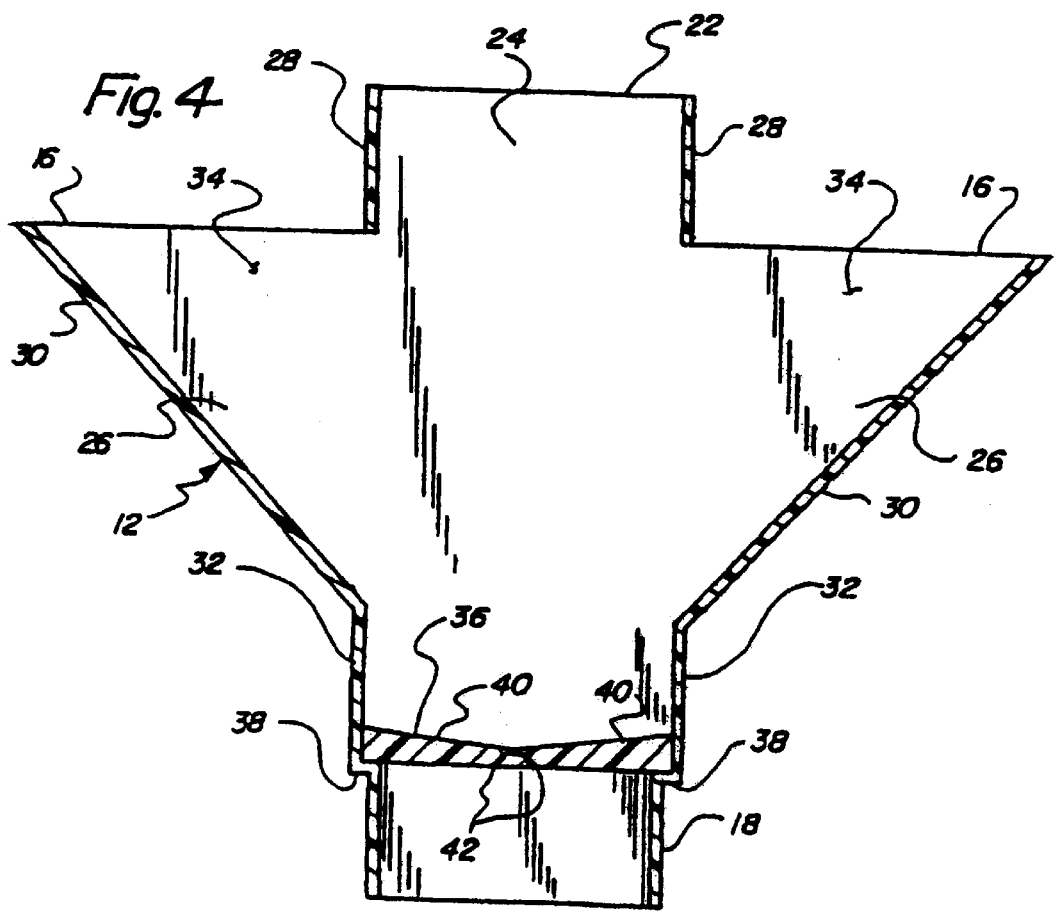
FIG. 4 illustrates a cross-section view taken along line 4—4 of FIG. 3.

As illustrated in FIGS. 3 and 4, each of the planting units 12 further includes a front wall 20 and a rear wall 22 spaced from the front wall 20 in a parallel orientation. The front and rear walls 20,22 are substantially identical in shape and each include a rectangular portion 24 and oppositely disposed triangular shaped wings 26, as best illustrated in FIG. 4. The front wall 20 is fixedly secured to the rear wall 22 and supported in the spaced, parallel orientation indicated in FIG. 3 by a plurality of side walls which include a pair of spaced upper side walls 28, a pair of medial side walls 30 and a pair of lower side walls 32. The pair of spaced upper side walls 28 extend orthogonally between the rectangular portions 24 of the front and rear walls 20,22. The pair of medial side walls 30 extend orthogonally between the spaced triangular wings 26 of the front and rear walls 20,22. The pair of lower side walls 32 extend orthogonally between the rectangular portions 24 of the front and rear walls 20,22. In this form, the medial side walls 30 and the lower side walls 32 cooperate with the front and rear walls 20,22 to define planting spaces 34 within the lateral receptacles 16 which are operable to support and permit the growth of plants extending from the lateral receptacles 16.

A medium retainer 36 to support the growing medium within the hollow center column 14 as well as the planting spaces 34 is removably mounted across a lowermost portion of the center column 14. The medium retainer 36 is disposed between the lower side walls 32 and the front and rear walls 20,22 by a ridge 38. The ridge 38 extends orthogonally and radially inward from the lower sidewalls 32 and the front and rear walls 20,22 to integrally or otherwise fixedly join the mounting flange 18, as best illustrated in FIG. 4. In the preferred embodiment, the medium retainer 36 is shaped so as to define angled floor portions 40 which cooperate to guide fluids through at least one drain hole 42 which extends through the medium retainer 36. The medium retainer 36 prevents compaction of soil within the lower planting units 12 by the weight of the soil contained within the upper planting units 12. Further, the at least one drain hole 42 disperses fluids through the medium retainer 36 to another planting unit 12 therebelow. The medium retainer 36 of the preferred embodiment includes a plurality of drain holes 42. Additionally, a plurality of vent apertures 44 extend through the lower sidewalls 32 to provide for increased aeration and ventilation of the growing medium contained within each of the planting units 12.

Variations in configuration of each of the planting units 12 include forming the center column 14 in a substantially tubular or circular shape, forming the lateral receptacles 16 in a substantially quarter round or semi-circular shape, as well as providing each of the center columns 14 with a plurality of lateral receptacles 16, such as 3 or 4, or therearound. In the preferred embodiment, the planting units 12 are formed of an integrally molded PVC plastic of white color. However, it is within the intent and purview of the present invention to integrally mold or otherwise secure together the components 20–38 of each of the planting units 12 by any conventional means utilizing any conventionally known material.

In one embodiment, the vertical growing column 11 of the lighting system for use with a vertical growing column 10 of present invention includes a plurality of shelf caps 46, as illustrated in FIGS. 5 and 6. Each of the shelf caps 46 is selectively mountable across the opening 17 of each of the lateral receptacle 16 so as to support a flower pot 48 or the like thereon. As best illustrated in FIG. 6, each of the shelf caps 46 comprises a cap plate 50 having a pair of inner flanges 52 spaced from a respective pair of outer flanges 54, with the inner flanges 52 cooperating with the respective outer flanges 54 to support the cap plate 50 atop both the front and rear walls 20,22. The cap plate 50 includes a recessed area 56 for receiving the flower pot 48 and imparting lateral stability to such pot 48. In this manner, the lighting system for use with a vertical growing column 10 may be utilized to support flower pots 48 or other containers as illustrated in FIG. 5.

Figure 11:
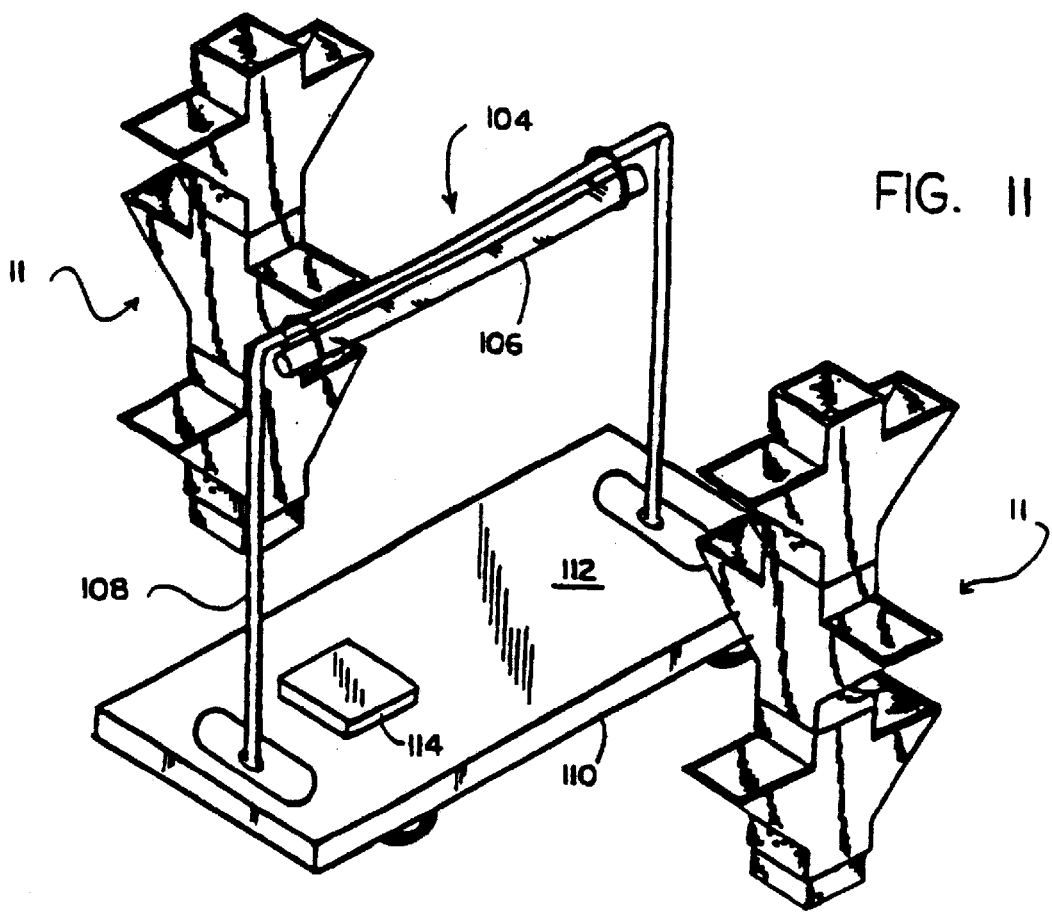
FIG. 11 is a perspective view of one embodiment of the lighting system for use with a vertical growing column which incorporates a sulfur light tube.

The lighting system 104 of the lighting system for use with a vertical growing column 10 is illustrated in FIG. 11. The lighting system 104 includes a light source 106 and an apparatus 108 for variably and adjustably disposing the light source 106 about the vertical growing column 11. In the preferred embodiment, the lighting system 104 utilizes lighting generated by a sulfur based light source. The lighting system 104 integrates sulfur lighting such as that manufactured by Fusion Lighting Systems, Inc., and related manufacturers, with vertical growing columns to provide year-round plant and vegetable growth under optimal growing conditions.

Fusion Lighting Systems, Inc.'s sulfur lights includes a quartz bulb whose sulfur-based plasma is heated by microwave energy generated by a magnetron 114, similar to those found in a microwave oven. The magnetron 114, in turn is activated by direct current electricity as provided by a conventional power supply. The sulfur light is adaptable to a variety of configurations. The lighting system 104 of the lighting system for use with a vertical growing column 10 lends itself to corresponding adaptability.

FIG. 11 depicts one illustration of the present invention. In this illustration, the lighting system for use with a vertical growing column 10 includes a lighting system 104 having at least one sulfur light tube 106 disposed on a movable stand 108 having a base 110. The stand 108 permits the adjustable placement of the lighting system 104 about a displacement of planting units 12. In this configuration, the magnetron 114 is disposed on an upper surface 112 of the base 110 of the movable stand 108. The lighting system 104 is movably adaptable to be placed in any desired relation to a row of vertical planting units 12, especially where it is desirable to form a plurality of both rows and columns of the units 12. Further, the lighting system 104 is vertically adjustable to render the desired quality and quantity of illumination to plants disposed within the planting units 12, regardless of the height of the column. The preferred embodiment of this illustration includes a plurality of sulfur light tubes 106 which are adjustably disposed at various heights on the movable stand 108 to provide variably disposed lighting from different heights and at different angles to all plants received in a plurality of rows and columns. FIG. 14 demonstrates one example of this preferred embodiment.

Figure 12:
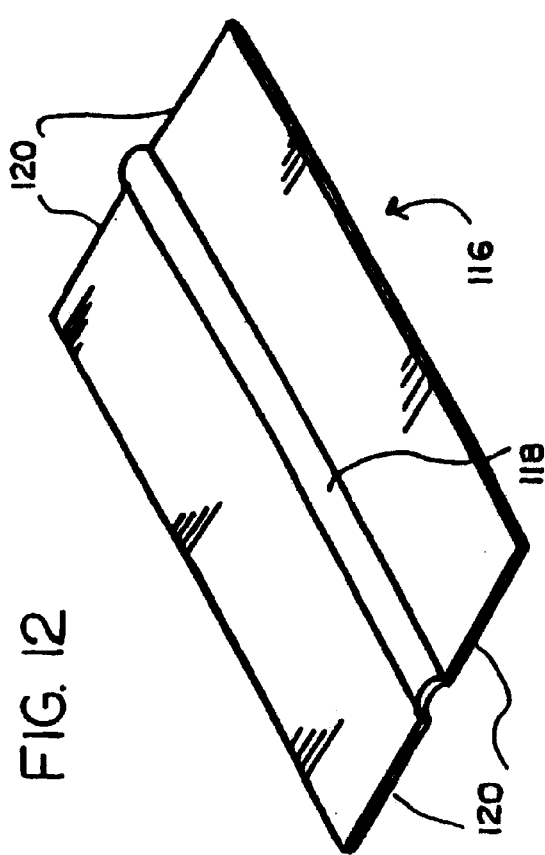
FIG. 12 is a perspective view of a reflector.
Figure 15:
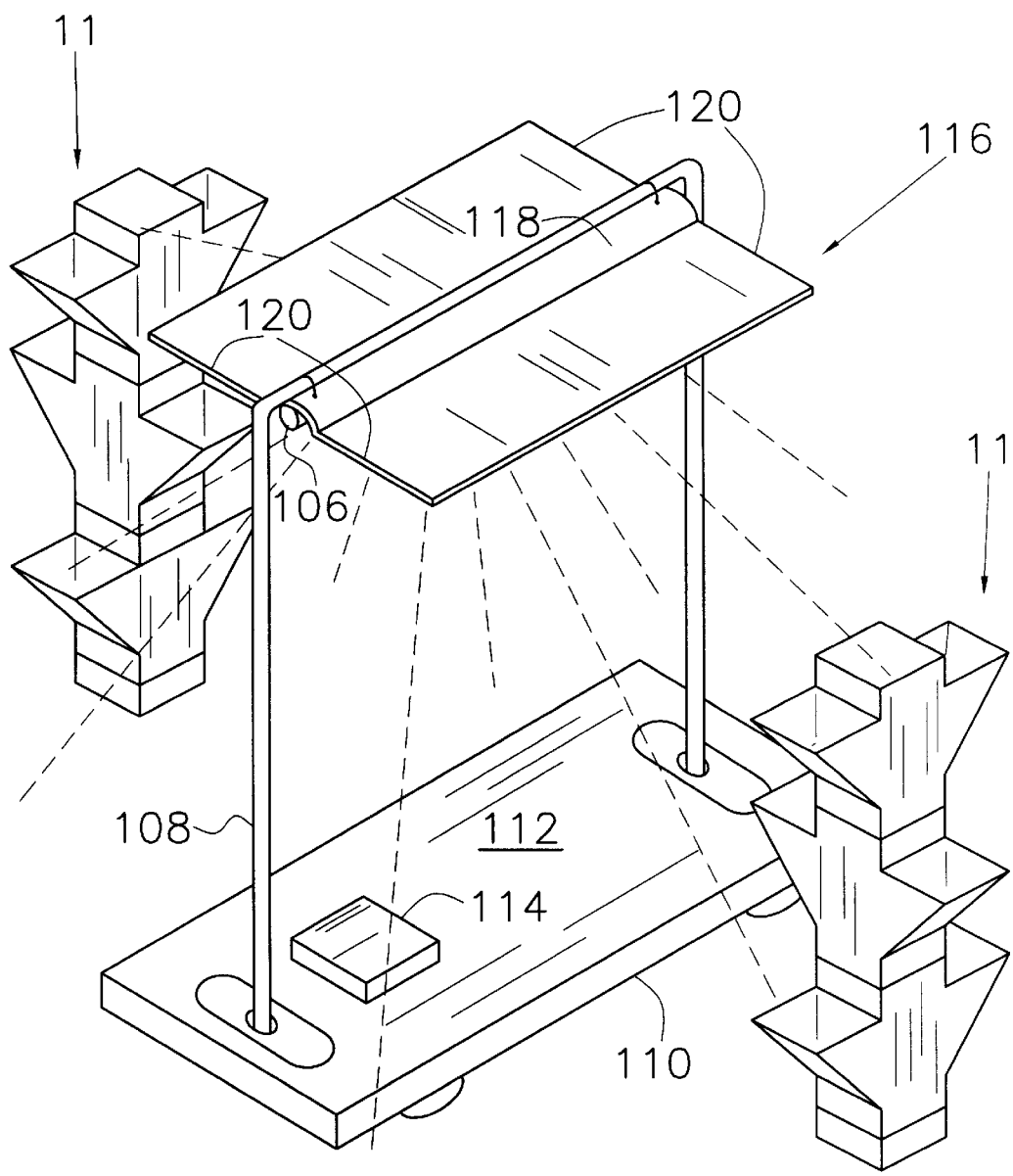
FIG. 15 shows an embodiment of the lighting system of the present invention including the light reflector.
Figure 16:
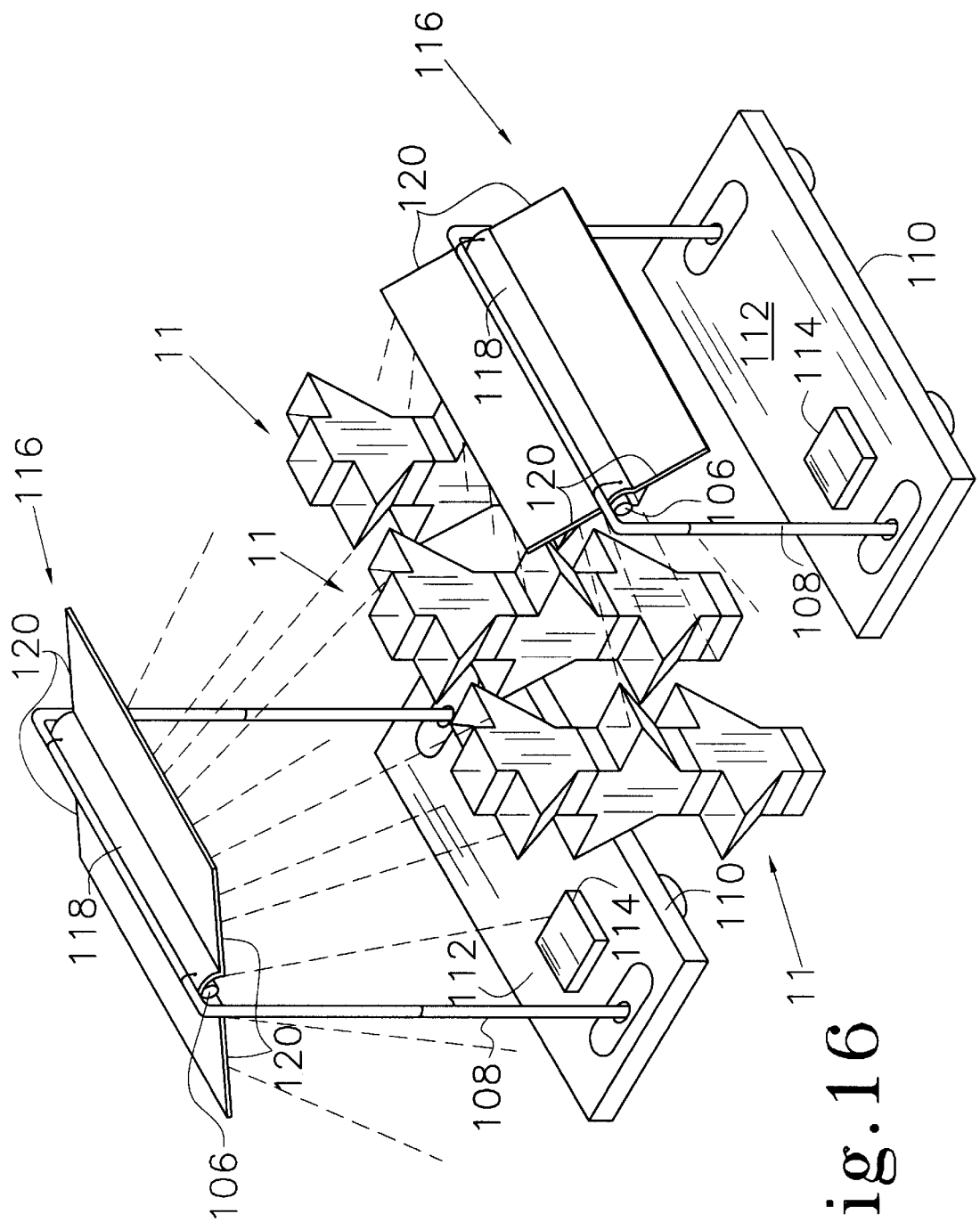
FIG. 16 illustrates an embodiment of the present invention in which a plurality of light sources are used at varying positions with a plurality of vertical growing columns.

Reflectors 116, such as that which is exemplified in FIG. 12, are of specific value in the lighting system 104 when there is a need or a desire to concentrate or heighten the intensity or direction of light dispersed about the plants. FIG. 15 illustrates one example of a reflector 116 in use with the lighting system 104 of the present invention for directing the sulfur light being dispersed about the plants. FIG. 16, in turn, illustrates an example of a cultivation system using a plurality of lighting systems 104 having a plurality of reflectors 116 for reflecting sulfur light on a plurality of growing columns 10 at differing angles. Other examples of reflectors 116 being employed about sulfur light tubes 106 at varying angles, for reflecting light in varying directions, are readily foreseeable. Those skilled in the art will recognize that reflectors 116 of a variety of shapes and configurations are feasibly adaptable to the sulfur lighting tubes of the lighting system 104. The reflectors 116 of the preferred embodiment, however, include a central contour 118 and a pair of reflective surfaces 120 which extend from opposed sides of the central contour 118 to direct the sulfur light. The reflector 116 of the preferred embodiment is removably secured about the diameter of the light tube 106 and is released upon manipulation of the pair of reflective surfaces 120 of the reflector 116.

Figure 13:
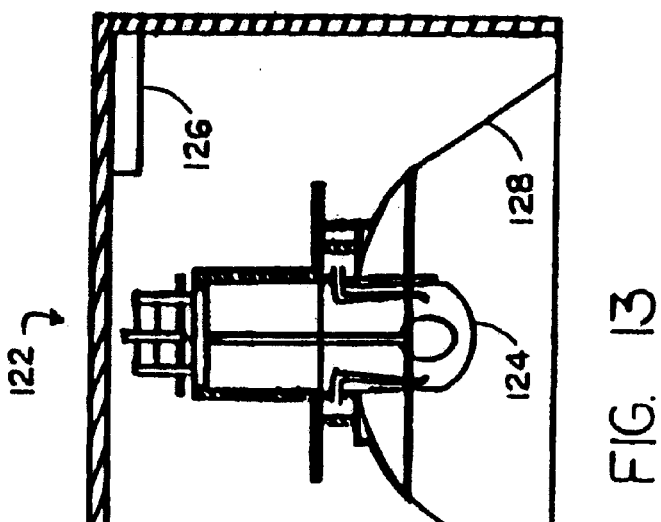
FIG. 13 is a cross-section view of an embodiment of a sulfur lighting fixture.

In a second illustration of the present invention, the lighting system for use with a vertical growing column 10 includes a lighting system 104 having sulfur light fixtures 122 which are secured to fixed locations within a greenhouse or growing facility. As shown in cross-section in FIG. 13, the sulfur fixtures 122 house a sulfur bulb 124, a magnetron 126 and a reflective media 128 surrounding the bulb 124. Those skilled in the art will recognize that the sulfur bulb 124, magnetron 126 and reflective media 128 of this configuration are adaptations of the identical components described in the first illustration of the present invention. Other configurations are equally feasible. Sulfur fixtures 122, such as those shown in section in FIG. 13, are readily disposed on overhead beams or pipes, vertical poles or columns, or other fixed aspects of the greenhouse or growing facility. It is also foreseeable that such fixtures 122 can be disposed within a floor's surface provided that the fixture is given adequate protection against weight pressure, which protection does not hinder the effective operation of the sulfur fixture 122 and ventilation. Utilizing this configuration, vertical growing columns are freely and easily movable beneath, around or above the sulfur light radiation emitted by the lighting system 104.

In the preferred embodiment, the lighting system for use with a vertical growing column 10 includes a lighting system 104 which utilizes a combination of sulfur light tubes 106 and sulfur light fixtures 122. In this embodiment, the system 104 employs a plurality of light tubes 106 which are disposed on movable, vertically adjustable stands 108 and a plurality of sulfur lighting fixtures 122 disposed in the environs of the growing facility to optimize the quantity and disposition of the sulfur lighting such that plant growth is stimulated and enhanced regardless of plant position in the vertical planting column 11 or the position of the planting column 11 in the greenhouse or growing facility.

Those skilled in the art will recognize that a number of other various bulb and light configurations are equally adaptable for successful deployment of the lighting system for use with a vertical growing column 10 as are the embodiments aforedescribed.

Figure 7:
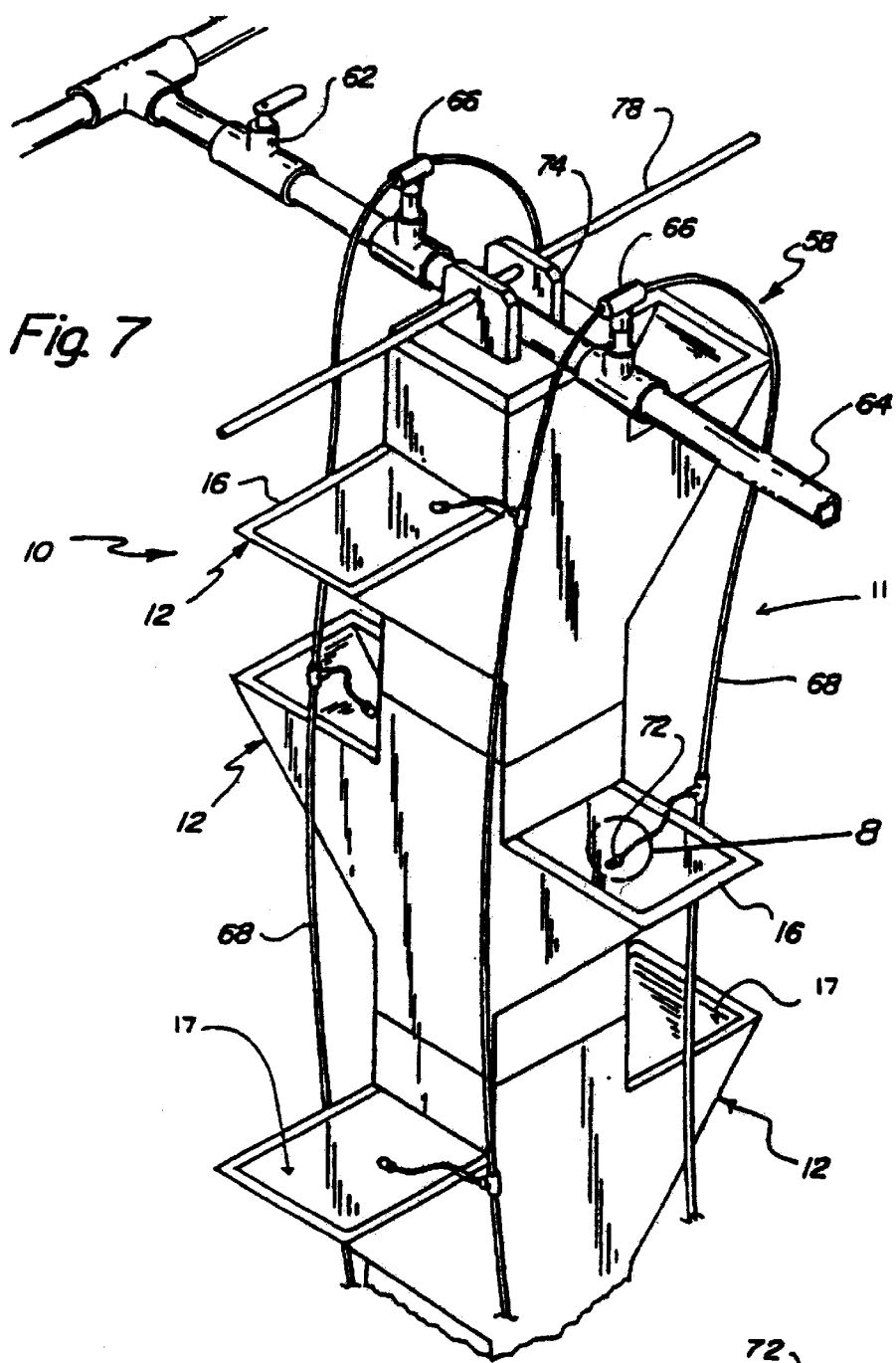
FIG. 7 is an isometric illustration of a vertical growing column including a fluid dispensing system.
Figure 8:
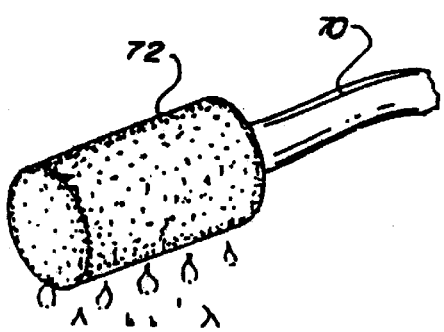
FIG. 8 illustrates an enlarged isometric illustration of a portion of the invention as set forth in FIG. 7.

The fluid dispensing system 58 of the present invention is illustrated in FIGS. 7 and 8. The fluid dispensing system 58 dispenses fluid to each of the lateral receptacles 16 of the vertical growing column 11. The fluid dispensing system 58 comprises a main supply line 60 supplying fluids through a valve 62 to a row supply line 64 from which a pair of distribution fittings 66 project. The distribution fittings 66 are in fluid communication with the row supply line 64 and are operable to permit fluid communication between the row supply line 64 and a plurality of delivery hoses 68 which drape downwardly therefrom, as best illustrated in FIG. 7. Each of the delivery hoses 68 supports and fluidly communicates with a plurality of delivery hose branches 70 which extend into the individual receptacles 16. The delivery hose branches 70 each terminate at a diffuser 72 which operates to diffuse and aerate the fluid being dispensed into the receptacle 16. In the preferred embodiment, the diffuser 72 comprises a porous ceramic material providing a tortuous path through which the fluid must pass. By this structure, the fluid dispensing system 58 operates to selectively maintain a desired amount of fluid within each of the plant receptacles 16. It should be noted that the delivery hoses 68 and associated branches 70 may be closely associated with or positioned within the columns 14 so as to provide for increased aesthetic appearance of the lighting system for use with a vertical growing column 10. In the preferred embodiment, however, the fluid dispensing system is externally disposed about the vertical growing column 11.

In certain growing situations, it is desirable to form a plurality of both rows and columns of the vertical growth columns 11. In such a case, it is preferable that the row supply lines 64 extend across adjacent columns 14 and rest upon the uppermost planting unit 12, as best illustrated in FIG. 7. To this end, a stabilizing cap 74 may be positioned atop the center column 14 of the uppermost planting unit 12. The stabilizing cap 74 includes a pair of spaced plates 76 between which the row supply line 64 preferably extends. To stabilize adjacent rows of a single column 14, a stabilizing rod 78 extends through and may be secured to the spaced plates 76 by a conventional fastener or connector. By this structure, a network of vertical growing columns 11 are structurally and fluidly interconnected within a growing facility or horticultural area.

Figure 9:
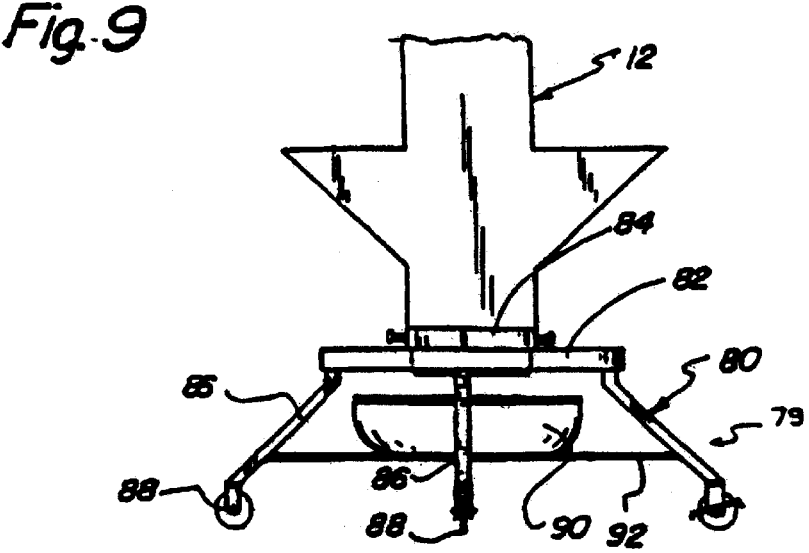
FIG. 9 is a front elevation view of a vertical growing column including a wheeled carriage.
Figure 10:
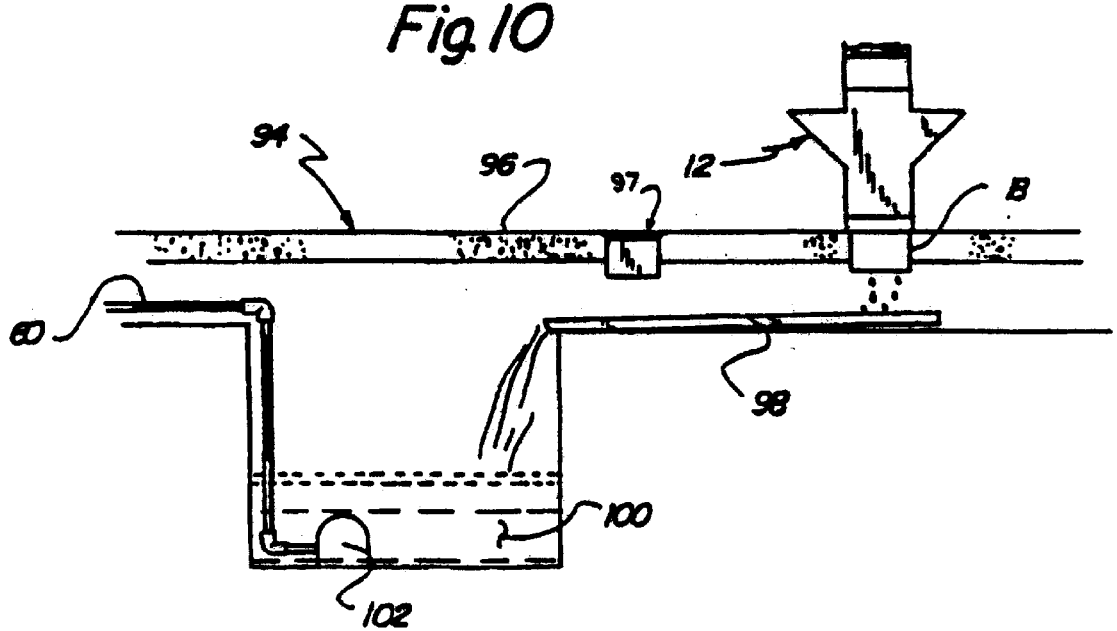
FIG. 10 illustrates a front elevation view of a vertical growing column including a floor installation.

FIGS. 9 and 10 illustrate a support structure 79 which may be utilized to support each of the lighting system for use with a vertical growing column 10 individually or as aligned in a substantially vertical orientation. In one embodiment, the support structure 78 consists of a wheeled carriage 80 having a frame 82 including a mounting receiver 84 which engages and supports the mounting flange 18 of a lowermost planting unit 12, as shown in FIG. 9. A plurality of support legs 86 extend from the frame 82 and terminate in rotatably mounted castors 88, thereby permitting selective wheeled movement of the support structure 78 or wheeled carriage 80 across a ground surface. Such movement can correspond with or be independent of the movement of the lighting system 104. A drain bowl 90 is positioned beneath the center column 14 of the lowermost planting unit 12 by a traverse member 92 which extends between at least a pair of the support legs 86.

In a second embodiment, the support structure 79 for supporting a lighting system for use with a vertical growing column 10 in a vertical orientation is illustrated in FIG. 10. This support structure includes a floor installation 94 wherein a floor 96 includes an aperture 97 for receiving the mounting flange 18 of the lowermost planting unit 12. A gutter 98 is located beneath the floor 96 to collect and direct the fluid emanating from the drain hole 42 of the medium retainer 36 to a sump 100 formed in a subsurface area beneath the floor 96. A pump 102 positioned within the sump 100 and fluidly connected to the main supply line 60 recirculates such fluid through the fluid dispensing system 58. Although not specifically illustrated, it is contemplated that a suitable filtering system may be employed to cleanse and condition such fluid.

From the foregoing description, it will be recognized by those skilled in the art that a lighting system for use with a vertical growing column 10 offering advantages over the prior art has been provided. Specifically, the lighting system for use with a vertical growing column 10 provides "near-sunlight" to enhance plant growth potential while reducing a plant's exposure to unwanted UV light. The lighting system for use with a vertical growing column 10 maximizes light color for plants while minimizing energy consumption costs in providing that lighting. Further, the lighting system 104 is easily positioned and repositioned about the modular plant units 12 to distribute light to inaccessible areas. The lighting system for use with vertical growing columns 10 also utilizes a lighting system 104 that increases environmental safety in the dispersal of light. The system 10 is of a durable and reliable construction and is easily maintained. The lighting system for use with a vertical growing column 10 utilizes a light system 104 which easily and efficiently manufactured and economically marketed to the buying public.

While a preferred embodiment has been shown and described, it will be understood that it is not intended to limit the disclosure, but rather it is intended to cover all modifications and alternate methods falling within the spirit and the scope of the invention as defined in the appended claims. While the foregoing invention relates to the growth and cultivation of plants, it will be recognized that use of the word "plants" is intended generically, and without limitation, to encompass mature plants, seedlings, saplings and other related forms of plant growth. Further, while the phrase "vertical growing column" is interpretable according to its common usage, as referenced herein, this phrase further includes any growing structures of any configuration which enhance the tonnage per unit area or per unit volume of product harvestable from plants cultivated in these columns.

Having thus described the aforementioned invention, I claim:

1. A cultivation system for cultivating plants in an indoor environment, said cultivation system comprising:
    at least one vertical growing column having a plurality of planting units of substantially similar construction, each of said planting units having a center column for reception within said center column of another of said planting units, a pair of lateral receptacles which extend from opposed sides of said center column and a front wall and a rear wall spaced from said front wall in a parallel orientation, said lateral receptacles defining an opening for receiving plants, growing media and plant nourishment, each said lateral receptacle being in fluid communication with said center column to provide a continuous volume of plant growing medium extending from a first one of said lateral receptacles to another of said lateral receptacles, said front and rear walls being identical in shape, said front and rear walls including a rectangular portion and oppositely disposed wings;
    at least one sulfur light source; and
    an apparatus for receiving and disposing said sulfur light source about said at least one growing column such that said light source provides sulfur light to plants disposed in said vertical growing column, regardless of position therein, thereby enhancing the quality and volume of the product produced by the plants disposed in said growing column.

2. The cultivation system of claim 1, wherein said oppositely disposed wings define a triangular configuration having a horizontal upper edge and a sloped lower edge, each of said oppositely disposed wings extending from a central portion of said front and rear wall rectangular portion such as to define an upper rectangular portion above said oppositely disposed wings and a lower rectangular portion below said oppositely disposed wings, each said planting unit further including a pair of spaced upper side walls, a pair of medial side walls, and a pair of lower side walls for maintaining said front and rear walls in a relative parallel orientation, said pair of spaced upper side walls extending orthogonally between said upper rectangular portions of said front and rear walls, said pair of medial side walls extending orthogonally between said sloped lower edge of said oppositely disposed wings of said front and rear walls, said pair of lower side walls extending orthogonally between said lower rectangular portions of said front and rear walls such that said medial and lower side walls cooperate with said front and rear walls to define planting spaces within said lateral receptacles to support and permit the growth of plants extending from said receptacles.

3. The cultivation system of claim 2 wherein said center column of each said planting unit cooperates with each other said center column of each other said planting unit disposed in a stacked configuration, said vertical growing column further including a medium retainer removably mounted in a lowermost portion of said center column of at least one planting unit in said stacked configuration for supporting growing medium within said center column, said medium retainer being disposed between said lower side walls and said front and rear walls by a ridge, said ridge extending orthogonally and radially inward from said lower side walls and said front and rear walls to fixedly join a mounting flange.

4. The cultivation system of claim 3 wherein said medium retainer includes at least one drain hole for dispersing fluids through said medium retainer.

5. The cultivation system of claim 2 wherein each of said lower side walls of each said planting unit further includes a plurality of vent apertures for increasing the aeration and ventilation provided to said growing medium contained within each said planting unit.

6. The cultivation system of claim 1 wherein said vertical growing column further includes an external fluid dispensing system for dispensing fluid to each of said lateral receptacles.

7. The cultivation system of claim 6 wherein said external fluid dispensing system includes a main supply line for supplying fluids through a valve to a row supply line, said row supply line having a pair of distribution fittings to provide fluid communication between said row supply lines and a plurality of delivery hoses, said delivery hoses being in fluid communication with a plurality of delivery hose branches which extend into each of said lateral receptacles, said delivery hose branches terminating in a diffuser which diffuses and aerates fluids being dispensed into each said lateral receptacle.

8. The cultivation system of claim 1 wherein said at least one sulfur light source further includes a magnetron for generating microwaves to operate said sulfur light source and said apparatus is a stand for receiving said at least one sulfur light source including said magnetron.

9. The cultivation system of claim 8 wherein said stand is movable and adjustable for variably orienting said sulfur light source about said at least one vertical growing column.

10. The cultivation system of claim 8 wherein said at least one sulfur light source includes a reflector having a contour and a pair of opposed reflective surfaces, said contour for releasably securing said reflector to said sulfur light source, said pair of opposed reflective surfaces for directing reflection of sulfur radiated light in a desired direction.

11. The cultivation system of claim 10 wherein said contour of said reflector is centrally disposed about said sulfur light source.

12. The cultivation system of claim 8 wherein said at least one sulfur light source is a sulfur light tube.

13. The cultivation system of claim 1 wherein said at least one sulfur light source is a sulfur light fixture for being disposed on a fixed surface, said sulfur light fixture including a magnetron for generating microwaves to power said sulfur light fixture and a reflector for directing the reflection of sulfur light radiated by said sulfur light fixture.

14. A cultivation system for cultivating plants in an indoor environment, said cultivation system comprising:

at least one vertical growing column having a plurality of planting units, each of said planting units defining a center column for reception within said center column of another of said planting units and a pair of lateral receptacles which extend from opposed sides of said center column, said pair of lateral receptacles defining an opening for receiving plants, growing media and plant nourishment, said pair of lateral receptacles being in fluid communication with said center column to provide a continuous volume of plant growing medium extending from a first one of said pair of lateral receptacles to another of said pair of lateral receptacles, each of said planting units including a front wall and a rear wall spaced from said front wall in a parallel orientation, said front and rear walls being identical in shape, said front and rear walls including a rectangular portion and oppositely disposed wings, said oppositely disposed wings defining a triangular configuration having a horizontal upper edge and a sloped lower edge, each of said oppositely disposed wings extending from a central portion of said front and rear wall rectangular portion such as to define an upper rectangular portion above said oppositely disposed wines and a lower rectangular portion below said oppositely disposed wings, each of said planting units further including a pair of spaced upper side walls orthogonally extending between said upper rectangular portions of said front and rear walls, a pair of medial side walls orthogonally extending between said sloped lower edges of said oppositely disposed wings of said front and rear walls, and a pair of lower side walls orthogonally extending between said lower rectangular portions of said front and rear walls;

at least one sulfur light source; and an apparatus for receiving and disposing said light source about said at least one growing column such that said light source provides light to plants disposed in said vertical growing column, regardless of position therein, thereby enhancing the quality of the product produced and augmenting the productivity of the plants disposed in said growing column.

15. The cultivation system of claim 14 wherein said center column of each said planting unit cooperates with each other said center column of each other said planting unit disposed in a stacked configuration, said vertical growing column further including a medium retainer removably mounted in a lowermost portion of said center column of at least one planting unit in said stacked configuration for supporting growing medium within said center column, said medium retainer being disposed between said lower side walls and said front and rear walls by a ridge, said ridge extending orthogonally and radially inward from said lower side walls and said front and rear walls to fixedly join a mounting flange, said medium retainer including at least one drain hole extending therethrough for dispersing fluids through said medium retainer.

16. The cultivation system of claim 14 wherein said lower side walls of each said planting unit further include a plurality of vent apertures for increasing the aeration and ventilation provided to said growing medium contained within each said planting unit.

17. The cultivation system of claim 14 wherein said at least one sulfur light source further includes a magnetron for generating microwaves to operate said sulfur light source and said apparatus is a stand for receiving said at least one sulfur light source and said magnetron.

18. The cultivation system of claim 17 wherein said stand is movable and adjustable for variably orienting said sulfur light source about said at least one vertical growing column.

19. The cultivation system of claim 17 wherein said at least one sulfur light source includes a reflector having a contour and a pair of opposed reflective surfaces, said contour for releasably securing said reflector to said sulfur light source, said pair of opposed reflective surfaces for directing reflection of sulfur radiated light in a desired direction.

20. The cultivation system of claim 19 wherein said contour of said reflector is centrally disposed about said sulfur light source.

21. The cultivation system of claim 17 wherein said at least one sulfur light source is a sulfur light tube.

22. The cultivation system of claim 14 wherein said at least one sulfur light source is a sulfur light fixture for being disposed on a fixed surface, said sulfur light fixture including a magnetron for generating microwaves to power said sulfur light fixture and a reflector for directing the reflection of sulfur light radiated by said sulfur light.

* * * * *